United States Patent [19]

Foley et al.

[11] E Patent Number: Re. 31,773

[45] Reissued Date of Patent: Dec. 18, 1984

[54] CATHODE RAY TUBE SYSTEM WITH STRIP CHART RECORDER DISPLAY FORMAT

[75] Inventors: Gerard M. Foley; Gerald Mosley, both of Melrose Park, Pa.

[73] Assignee: Leeds & Northrup Company, North Wales, Pa.

[21] Appl. No.: 305,864

[22] Filed: Sep. 28, 1981

Related U.S. Patent Documents

Reissue of:

[64] Patent No.: 3,752,917
Issued: Aug. 14, 1973
Appl. No.: 187,300
Filed: Oct. 7, 1971

[51] Int. Cl.[3] ..... H04N 7/18

[52] U.S. Cl. ..... 358/93; 324/121 R; 340/720; 340/726; 340/733; 340/800; 340/804

[58] Field of Search ..... 358/93; 340/720, 726, 340/733, 800, 804, 722, 744, 747, 793, 798, 803; 324/121 R; 315/22, 18

[56] References Cited

U.S. PATENT DOCUMENTS

| | | | |
|---|---|---|---|
| 3,404,309 | 10/1968 | Massell | 340/720 |
| 3,406,387 | 10/1968 | Werme | 340/870.15 |
| 3,474,438 | 10/1969 | Lauher | 324/121 R |
| 3,500,115 | 3/1970 | Auger | 315/18 |
| 3,577,031 | 5/1971 | Welsh | 315/22 |
| 3,725,901 | 4/1973 | Lehari | 340/722 |
| 3,725,901 | 4/1973 | Lehari et al. | 340/722 |
| 3,725,917 | 4/1973 | Sletten | 343/55 A |
| 3,752,917 | 8/1973 | Foley | 358/93 |

FOREIGN PATENT DOCUMENTS

| | | |
|---|---|---|
| 2014953 | 5/1972 | Fed. Rep. of Germany . |
| 1808245 | 5/1974 | Fed. Rep. of Germany . |

*Primary Examiner*—Howard W. Britton
*Attorney, Agent, or Firm*—Raymond F. MacKay; Harold Huberfeld

[57] ABSTRACT

A time variant measured variable is graphically displayed in moving strip chart format on a cathode ray tube. During a scan line the electron beam is intensity modulated at a position on the scan line whith represents the magnitude of the measured variable at a given time. The intensity of the electron beam at positions in successive scan lines is similarly intensitymodulated to produce a trend line representing the magnitude of the variable along the strip chart format. During the scanning of a subsequent raster frame, a new data value of the measured variable is displayed at a selected position at an edge of the viewing area of the strip chart format in thwe location previously occupied by the next sequential value and the older data values are simultaneously displaced. The oldest data value is deleted from the format. During a raster scan the electron beam is modulated at different intensity levels to produce chart lines and time lines on the strip chart format. During each scan line the electron beam may be turned on between a reference position and the position at which the measured variable is recorded to produce a shaded trend line more readily distinguished from other trend lines on the face of the tube. In a modification, a color picture tube produces the different intensity traces so that chart lines, time lines and trend lines are all readily distinguishable one from the other.

14 Claims, 23 Drawing Figures

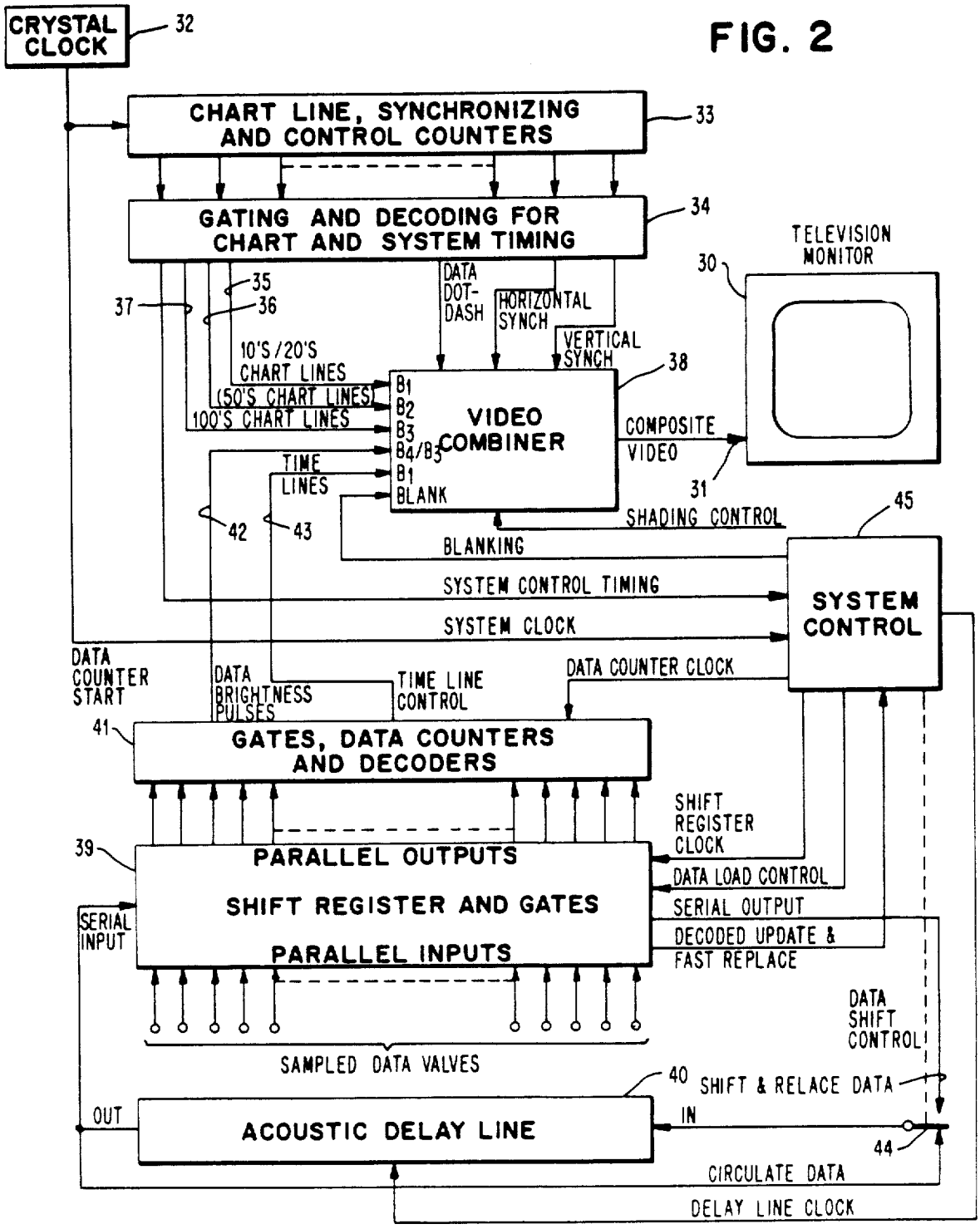
FIG. 2
CRYSTAL CLOCK
32
CHART LINE, SYNCHRONIZING AND CONTROL COUNTERS
33
GATING AND DECODING FOR CHART AND SYSTEM TIMING
34
TELEVISION MONITOR
30
35
36
37
DATA DOT-DASH
HORIZONTAL SYNCH
VERTICAL SYNCH
10'S/20'S CHART LINES
(50'S CHART LINES)
100'S CHART LINES
38
B1
B2
B3
B4/B3
B1
BLANK
VIDEO COMBINER
COMPOSITE VIDEO
31
TIME LINES
42
43
SHADING CONTROL
45
BLANKING
SYSTEM CONTROL TIMING
SYSTEM CONTROL
SYSTEM CLOCK
DATA COUNTER START
DATA BRIGHTNESS PULSES
TIME LINE CONTROL
DATA COUNTER CLOCK
41
GATES, DATA COUNTERS AND DECODERS
SHIFT REGISTER CLOCK
39
PARALLEL OUTPUTS
SHIFT REGISTER AND GATES
PARALLEL INPUTS
DATA LOAD CONTROL
SERIAL OUTPUT
DECODED UPDATE & FAST REPLACE
SERIAL INPUT
DATA SHIFT CONTROL
SAMPLED DATA VALVES
40
SHIFT & RELACE DATA
OUT
ACOUSTIC DELAY LINE
IN
44
CIRCULATE DATA
DELAY LINE CLOCK

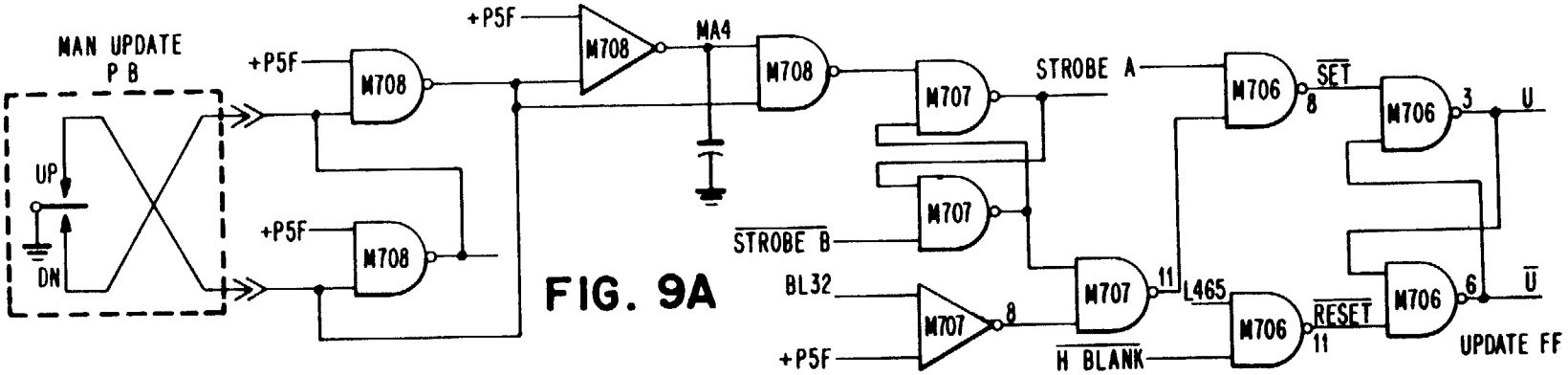
FIG. 9A
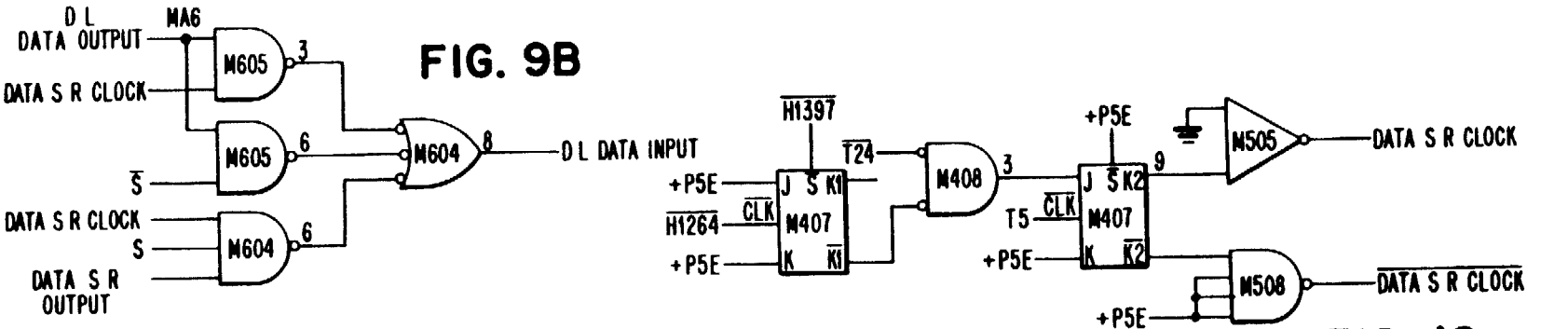
FIG. 9B
FIG. 10
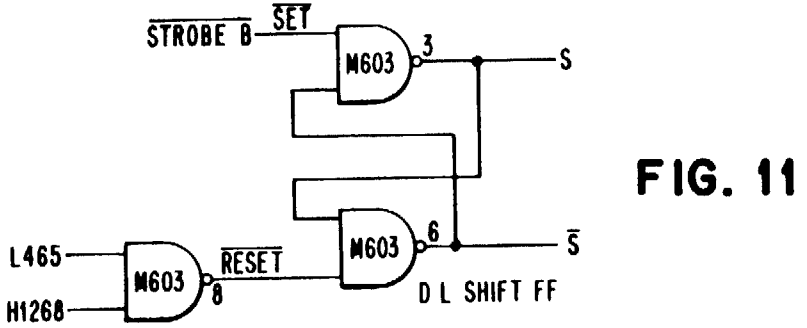
FIG. 11

CATHODE RAY TUBE SYSTEM WITH STRIP CHART RECORDER DISPLAY FORMAT

Matter enclosed in heavy brackets [ ] appears in the original patent but forms no part of this reissue specification; matter printed in italics indicates the additions made by reissue.

BACKGROUND OF THE INVENTION

This invention relates to methods and apparatus for data display and more particularly to the display of a measured variable in a moving strip chart format on a cathode ray tube.

Moving pen strip chart type recorders have been extensively used in industry to produce representations of measured dependent variables as a function of an independent variable, usually time. For example, in electric power generating plants moving pen recorders continuously monitor many of the parameters of power generation. The strip chart records provide an excellent visual representation of the operation of the plant at any given time. It has become common to record two or more measured variables on the same strip chart to provide a convenient way of directly comparing these measured variables one with the other to better determine their interrelationships. While the format of analog strip chart recorders has become widely accepted as a useful display medium, the extensive use of strip chart recorders has attendant problems.

Strip chart recorders produce a large amount of records and quite often it is only portions of these records produced in short time intervals which need to be studied. Further, it is only possible to record a limited number of measured variables on a single strip chart record without confusion. Often, two or more measured variables which the operator wishes to compare are not recorded on the same strip chart. In fact, if a large number, such as 100, measured variables are being recorded, the chances of two measured variables, which are desired for comparison, appearing on one strip chart are small.

Another disadvantage of the extensive use of strip chart recorders is caused by the necessary physical distance separating the recorders. In order to observe all of the measured variables, it is necessary for the operator to move from one strip chart recorder to another.

Finally, of course, strip chart recorders have the disadvantage of moving mechanical elements, such as the recorder pen. The movement of mechanical elements places an inherent limit on the speed of response, and accuracy of a moving pen strip chart recorder.

One example of a strip chart recorder is shown in U.S. Pat. No. 3,389,397—Lex et al.

Recently, cathode ray tubes have been extensively used for graphical data display. These devices avoid the problems of moving mechanical elements which are present in strip chart recorders. Refer for example to "A Color-Television Graph Plotter for Digital Computers," Claude A. Wiatrowski, Computer Design, April 1970, pages 133-136. This article describes the display of graphs in multiple colors on a cathode ray tube. "Drum and Scope Unit Plots Plant Variables," John Werme, Control Engineering, November 1964, Page 109, describes the display of a process variable on an oscilloscope type display screen. While graphic display systems of the foregoing type are extensively used in many applications, they are not suitable for use as a replacement for strip chart recorders in the monitoring of measured variables of industrial processes. As one reason, they are not capable of displaying the measured variables in a format to which operators have become accustomed and which format is particularly convenient for the monitoring of these measured variables.

SUMMARY OF THE INVENTION

In accordance with this invention a measured dependent variable is displayed in moving strip chart format on a cathode ray tube. The relationship between one or more measured variables, and another variable, usually time, is displayed as an erasable record on cartesian coordinates.

In carrying out the invention the electron beam is intensity modulated at positions in the scan lines of the raster frames which represent the magnitude of the measured variable. For some selected subsequent raster frames the data values are displaced with respect to the scan lines. At least one new data value is added at one extreme of the display and at least one data value at the other extreme is deleted. In this manner, a display is obtained of a trend line representing the measured dependent variable as a function of the independent variable, in this instance time. In this manner a moving display of the measured variable as a function of time is presented in a format which closely resembles that of a moving strip chart recorder.

In accordance with another important aspect of this invention, shading is provided for one or more of the trend lines. In carrying this out, the electron beam is intensity modulated between a reference position and the position representing the magnitude of the measured variable on each scan line. In this manner, the screen is brightened between a reference line and the trend line. This has several advantages. When more than one trend line is displayed, the trend line with shading can be more easily distinguished from other trend lines. Also, the shading clarifies the time sequence of widely separated data values and the shading makes it easier to perform a visual interpolation on rapidly changing data values. Finally, the shaded trend line gives a visual impression of the value of the time integral of the measured variable.

In accordance with another aspect of this invention, scale lines and time lines are displayed with different intensities than the trend lines. This makes the scale lines and time lines more readily distinguishable from the trend lines.

In accordance with another aspect of this invention, the different intensities of the trend lines, scale lines and time lines are displayed by different colors on the face of a color cathode ray tube.

The foregoing and other objects, features and advantages of the invention will be better understood from the following more detailed description, appended claims and drawings.

DESCRIPTION OF THE DRAWINGS

FIG. 2 is a block diagram of the system;

FIG. 9A shows the update flip flop;

FIG. 9B shows the interlace gates;

FIG. 10 shows the shift register control circuit;

FIG. 11 shows the delay line shift flip-flop;

DESCRIPTION OF ONE EMBODIMENT OF THE INVENTION

Figure 1:
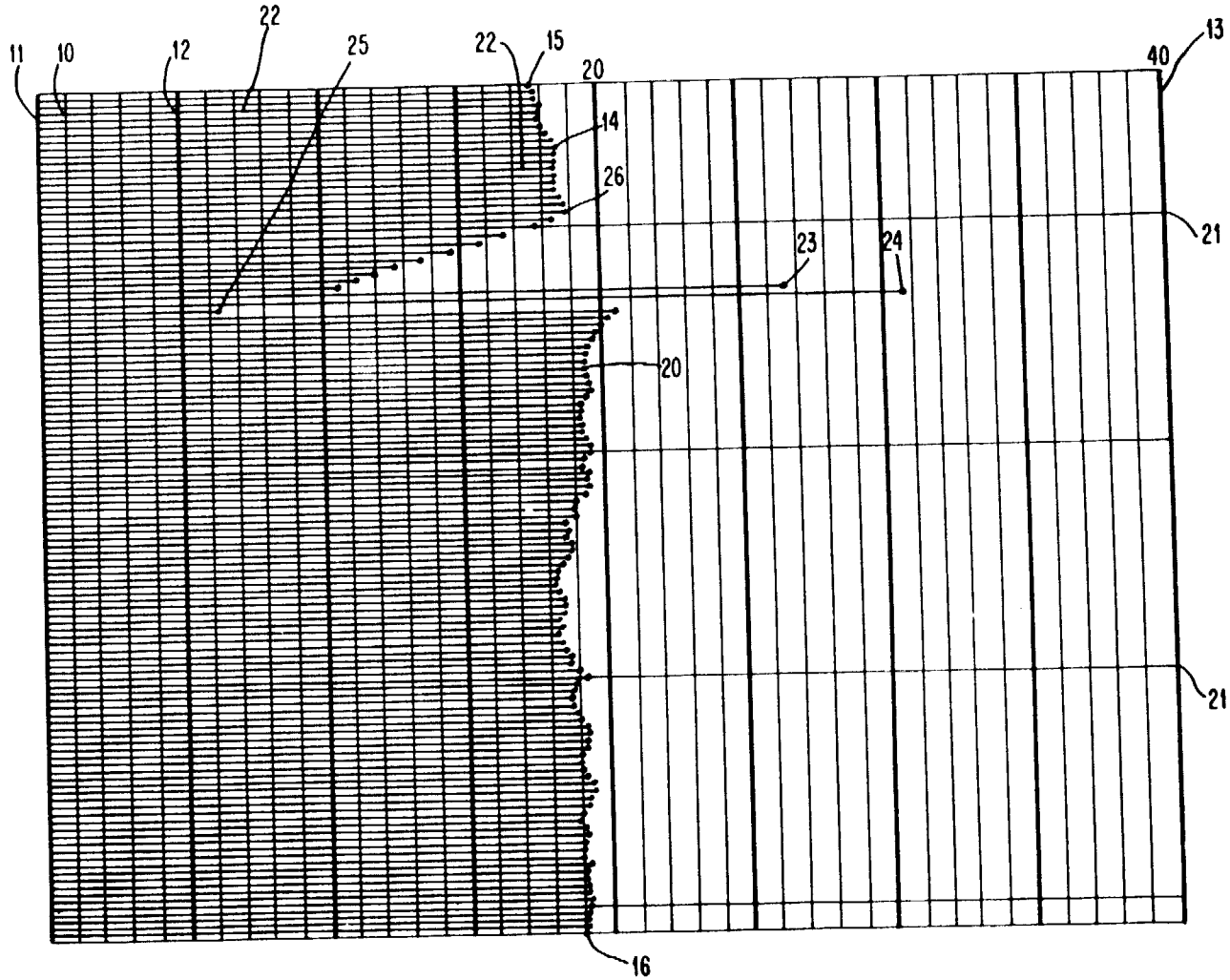
FIG. 1 depicts a display produced by this invention.

FIG. 1 illustrates a display produced on the screen of a cathode ray tube television monitor by the system of this invention. FIG. 1 is a negative representation of the display which appears on the cathode ray tube screen. That is, a very heavy mark on FIG. 1 represents a very bright mark on the television screen, a moderately heavy mark represents a moderately bright mark on the screen and so on. FIG. 1 shows the display of only a single measured variable although more than one variable can be displayed.

In FIG. 1 the left-hand vertical scale or chart line 11 represents the lowest value the variable is expected or permitted to have, and the right-hand vertical scale line 13 represents the highest value the variable can have. Other vertical scale lines such as 10 and 12 form a linear chart with which the data marks representing the values of the measured variable can be compared.

Successive values of the variables are represented by the data marks such as 14. These marks occur at horizontal positions in each scan line of the raster field. The position represents the magnitude of the measured variable at a particular time. For example, the data mark 14 depicts a magnitude between 18 and 19 scale units. The series of data marks forms a trend line.

The most recent value of the variable is represented by the uppermost data mark 15 and the oldest value displayed is represented by the data mark 16 at the bottom.

The continuous horizontal lines such as 21 are time lines. Each of the time lines appears in association with a particular data mark representing the value of the variable measured at the time represented by the time line. The brightness of the time lines is less than the brightness of the data marks so that the latter will not be obscured. The vertical time scale represented by these time lines is a measure of real time at which the data values of the measured variable were taken.

In FIG. 1, horizontal shading lines such as 22 extend from the vertical left-hand scale line 11 to each data mark. In this case, the vertical scale line 11 is the reference line. These horizontal lines 22 may be switched on or off at the option of the viewer to provide shading (actually brightening) of the screen to the left of the trend line.

This shading has several important functions. When more than one trend line is displayed, the trend line with shading can be readily distinguished from other trend lines. Where successive data values vary in magnitude greatly, as do the data marks 23, 24 and 25, the shading makes it very easy to distinguish whether a particular data mark represents a time earlier or later than that represented by another data mark. In FIG. 1, the shading makes it clear that the data mark 24 occurred at a later time than the data mark 25. Also, when the data marks are rapidly changing as are those between the marks 26 and 25 the shading makes it easier to perform a visual interpolation of the trend line.

The system shown in the block diagram of FIG. 2 generates such a display. The system includes a cathode ray tube television monitor 30. This monitor is of a conventional type having an electron beam positioning circuit which scans the electron beam in a raster field of scan lines. The monitor 30 also has an intensity modulating control circuit which is controlled by a composite video signal applied to the input 31. This composite video signal is in the form of an amplitude modulated voltage carrying vertical and horizontal synchronizing pulses and a video signal. The system of this invention generates such a composite video signal.

A source of clock pulses 32 divides each scan line of the electron beam into equal time increments. A counter 33 receives clock pulses. These clock pulses are decoded by the gating and decoding circuitry 34 which generates signals for intensifying the brightness of the cathode ray screen at selected positions on each scan line. For example, the gating circuit 34 produces signals on the lines 35–37 at predetermined count intervals. These outputs (subsequently referred to as a second output) produce the scale lines, for example, the scale lines 10, 11 and 12 of FIG. 1. The outputs on lines 35, 36 and 37 are combined into the composite video signal by the combiner 38.

The gating and decoding circuits 34 also produce horizontal sync and vertical sync pulses which are similarly combined into the composite video signal by the combiner 38. The gating and decoding circuit 34 also produces a signal referred to as "data dot dash." This signal modulates the intensity of data marks along a trend line. This technique is useful when a plurality of trend lines are displayed in order to distinguish one trend line from another.

The sampled data values of the measured variable are supplied to the system of FIG. 2 is conventional binary coding at the terminals labeled "sampled data values." In the system to be described each sampled data value is contained in a 10-bit word. A digital data storage device stores a binary coded serial data stream of these data values. This digital data storage device includes shift register 39 and acoustic delay line 40. The acoustic delay line 40 normally forms a circulating path for the data values.

In the system being described there are 465 visible scan lines in a raster field. Therefore there are normally 465 data values for each trend line circulating in the digital data storage device. The system is capable of displaying three trend lines. Therefore, there are three ten-bit word data values for each scan line. (Actually 31-bit words are used out of 35 available bit positions, 30 bits being used for the data values and 1 bit being used for the time line.)

The data words, or values, circulating to shift register 39 are decoded by circuitry indicated as gates, data counters and decoders 41. At a position in each scan line, which position is denoted by the data word, a data brightness pulse is produced on the line 42. (The data brightness pulse is subsequently referred to as a first output signal.) This output signal is also combined into the composite video signal by the combiner 38.

The gates, data counters and decoders 41 also produce a time line control signal on the output line 43. The time line control signal (subsequently referred to as a third output) is mixed into the composite video signal to modulate the intensity of the electron beam at a different intensity level to produce the time lines such as the lines 21 in FIG. 1.

The data words recirculating in the delay line 40 and circulating to shift register 39 are decoded during a first raster frame to produce one (or more) trend lines. At the beginning of a subsequent raster frame, a 31-bit data word representing a new data value is inserted in the stream circulating in the delay line in the position formerly occupied by the data word representing the next most recent value of the measured variable. The latter is inserted in the place formerly occupied by the next older data word and so on. In this manner the data storage device is updated with each data word being displaced with respect to the scan line on which it was previously displayed. At least one new data value is added at one extreme of the display and at least one data value is deleted at the other extreme of the display. The updating function is indicated by the switch 44 in FIG. 2. Normally this switch is in the lower position so that the data words in the stream recirculate from the output to the input of the acoustic delay line 40. These data words are also shifted into the shift register 39 for readout. During an update operation the switch 44 is actuated to its upper position. Data values then recirculate from the output of the shift register to the input of the delay line. The new value is inserted at the appropriate place in the bit stream. Now there are 466 data values in the bit stream.

The switch is restored to its lower position when the shift register contains the data value which previously controlled the last raster line of the display. This procedure results in 465 values, including one new value and lacking one old value, circulating in the delay line, automatically synchronized with the scanning so as to appear on the screen in the same place as did the old data sequence. The lengthening of the bit stream caused the data values to be shifted by one position with respect to the scan line on which they are displayed.

Summarizing the update, during a first raster field, each data word in the stream modulates the electron beam during one scan line; the first word, representing the measured variable at a first time, modulates the first scan line; the second word modulates the second scan line and so on. During a subsequent raster field, a new data value, representing the measured variable at a second time, (either earlier or later), modulates the first scan line. All subsequent scan lines are modulated by the data words which have been shifted in position in the bit stream with respect to the scan lines.

During periodic updating the display on the monitor screen appears to move downward as if a piece of paper bearing the markings on the screen were being unrolled and written on at the top and rolled out of sight at the bottom.

All the operations of the system are under control of the system control indicated at 45. This control produces blanking pulses to blank the electron beam during retrace. It also provides clock pulses and load control pulses to the shift register 39.

OPERATION OF THE SYSTEM

Figure 3D:
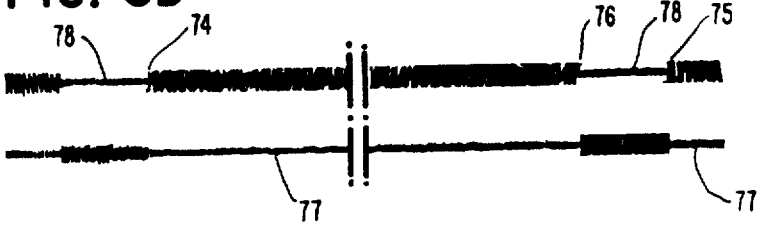
FIGS. 3A-3D are representations of oscillograms of waveforms depicting the operation of the system.
Figure 3A:
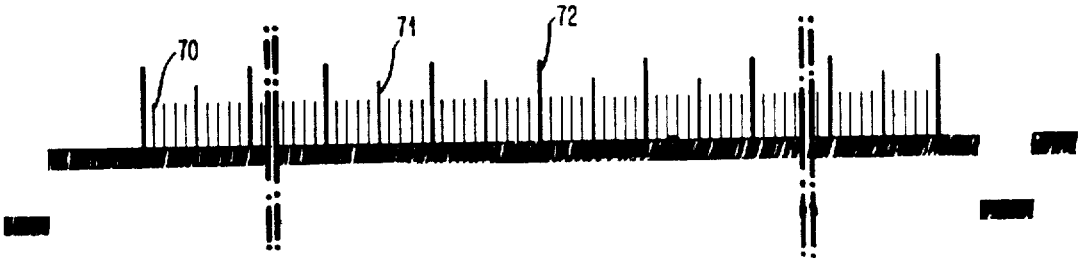
Figure 3B:
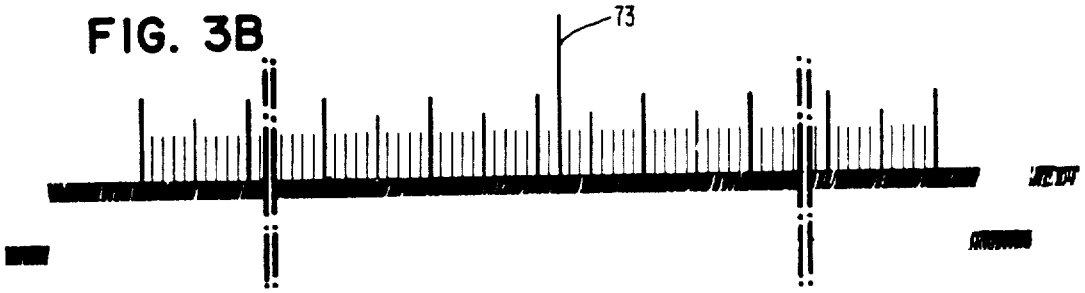
Figure 3C:
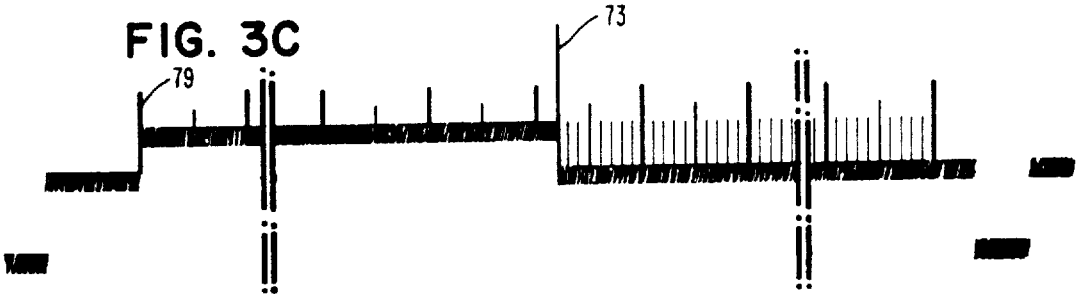

The operation of the system will be apparent from FIGS. 3A–3D which are representations of oscillograms of the waveforms of the composite video signal and the synchronizing signals. FIGS. 3A through 3C each show the composite video signal during the scanning of one scan line. FIG. 3A shows the pulses, such as 70, which occur at every 10 clock pulses. Pulses such as 71 occur at every 50 clock pulses and pulses such as 72 occur at every 100 clock pulses. The height of the pulses 70–72 determines the relative intensity of the chart lines.

FIG. 3B shows the composite video signal with the same scan mark pulses, and in addition, it shows a pulse which produces one of the data marks on each scan line. The pulse 73 produces a data mark on each scan line representing a measuring value.

FIG. 3C shows the foregoing pulses and additionally shows the signal which produces shading between the reference mark pulse 79 and the data mark pulse 73. Note that the composite video signal has an amplitude which is the same as the amplitude of the pulse 70 during the portion of the scan line from zero (left-hand edge) to the data mark pulse 73. This intensifiers the beam to the same brightness as the ten's chart marks.

FIG. 3D shows the vertical and horizontal sync signals. The time between the points 74 and 75 is one complete frame. At 76 the vertical sync signal occurs. This causes the electron beam to shift back from the end of the last scan line displayed to the beginning of the first scan line displayed on the next frame. The other regularly occurring pulses 77,78 shown in FIG. 3D are the horizontal sync pulses which occur at the end of each scan line.

Figure 4:
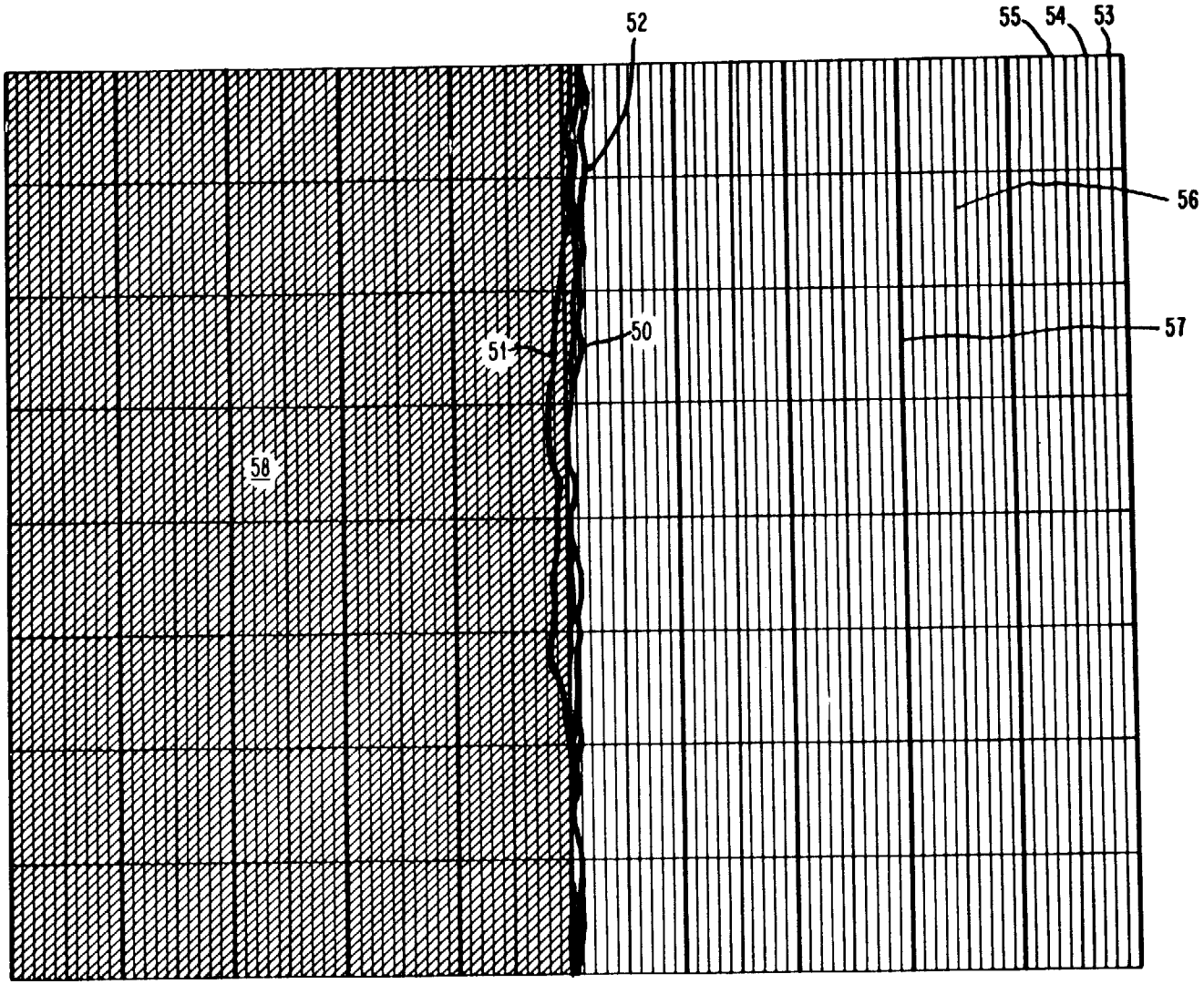
FIG. 4 is a representation of the appearance of a display with three trend lines.

FIG. 4 is an artist's representation of a display in which three measured variables are displayed as the trend lines 50,51 and 52. The display of FIG. 4 has 100 chart lines but the specific system being described is also capable of producing a 50-line display.

The chart lines such as 53,54 and 55 in FIG. 4 are produced at every ten time increments, that is, ten clock pulses. The lines 53,54 and 55 and other similar lines are intensified to the lowest level of brightness. At every 50 time increments a line such as the line 56 is intensified to an intermediate level of brightness. At every 100 time increments a scale line such as 57 is intensified to a high level of brightness. The data marks making up the trend lines 50–52 are intensified to a fourth, highest level of brightness. In FIG. 4 the shading indicated by reference numeral 58 is at the same intensity level as the scale lines 53–55. The shading is represented in FIG. 4 by diagonal and vertical cross hatching which is not present on the screen of an actual display.

DETAILED DESCRIPTION OF THE SYSTEM

A detailed schematic of the system of FIG. 2 is shown in FIGS. 5–18. These figures do not show in detail the conventional television monitor 30. In the specific embodiment being described it is a CONRAC Model CQF 17/1024/SP television monitor which displays 60 frames per second. Each raster frame has a nominal 513 scan lines. Of these 513 lines, 465 lines are visible and 48 scan line times are allowed for vertical flyback.

The acoustic delay line is a Tyco Digital Devices 319E-2-83 magnetostrictive delay line having a delay of 8.333 milliseconds and a bit rate of $2.1546 \times 10^6$ bits per second.

The remainder of the system is depicted in FIGS. 5-18 as executed with logical elements in which logical zero is represented by ground level, and logical one is represented by a positive signal. The system includes integrated circuit modules designated, for example, M102 or N707. Most of these circuit modules contain two or more functional circuit elements. In general a particular functional circuit element is identified by appending a number designating an output terminal of the module. Thus, for example, the two of the four elements contained in module M102 (top left of FIG. 5) are designated M102-8 and M102-11. A table at the end of this section, identifies typical components suitable for use. For example, gate M102-8 identifies one gate of a quad NOR gate.

THE SOURCE OF CLOCK PULSES AND THE TIME INCREMENT COUNTER, FIG. 5

Figure 5:
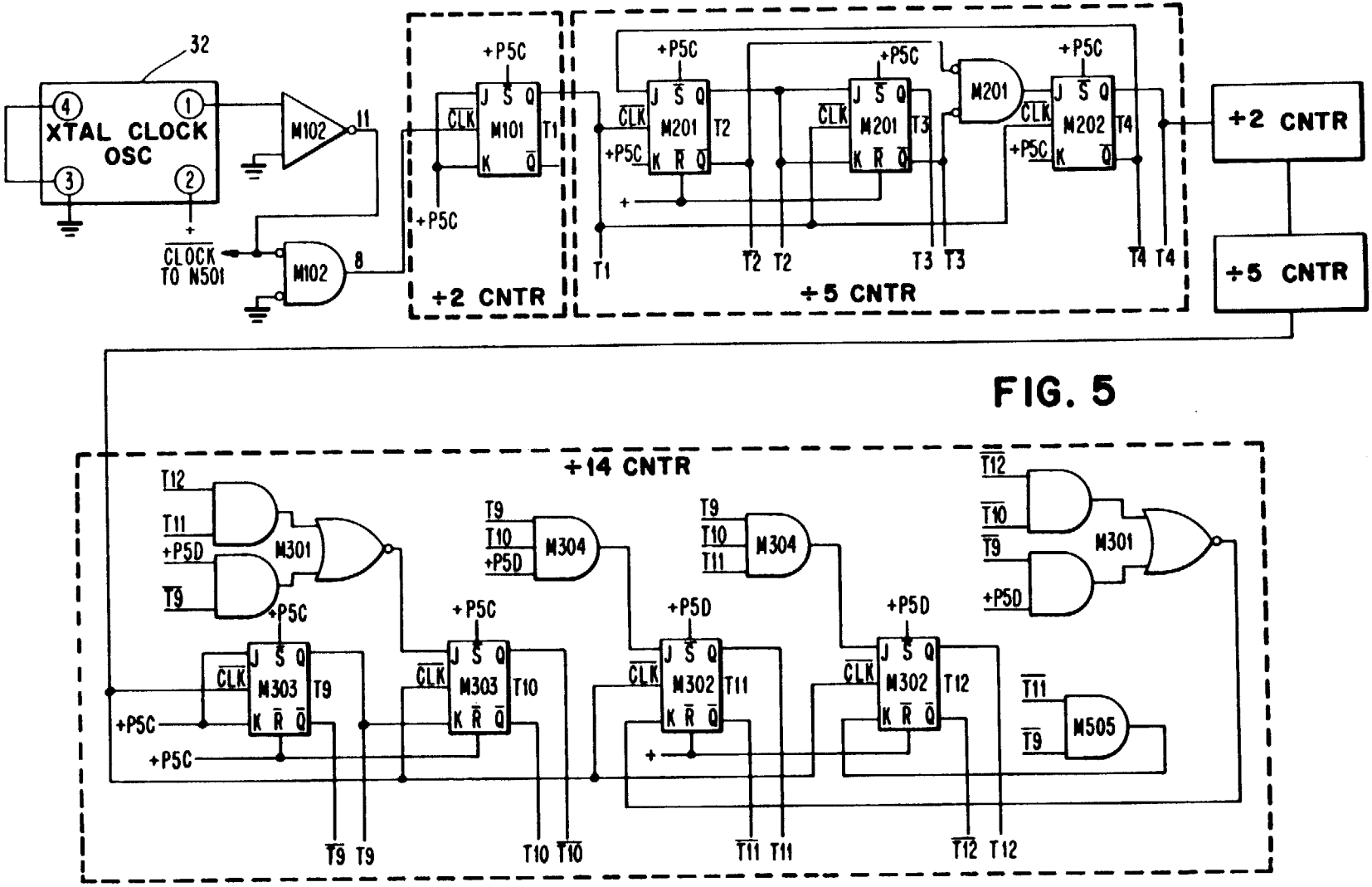
FIG. 5 shows the source of clock pulses and the counter.

In FIG. 5 the source of clock pulses is the quartz crystal clock 32. The pulses from this clock are applied to a counter including the JK flip-flop stages M101-M302. As indicated these stages provide two divide by 5 counters, two divide by 2 counters, and a divide by 14 counter. The outputs of these counter stages are denoted T1, T2, T3 . . . T12 and the complement outputs are denoted $\overline{T2}$, $\overline{T3}$, . . . $\overline{T12}$. The outputs are applied to gating and decoding circuitry shown in FIGS. 6, 10, 14 and 16.

Figure 6:
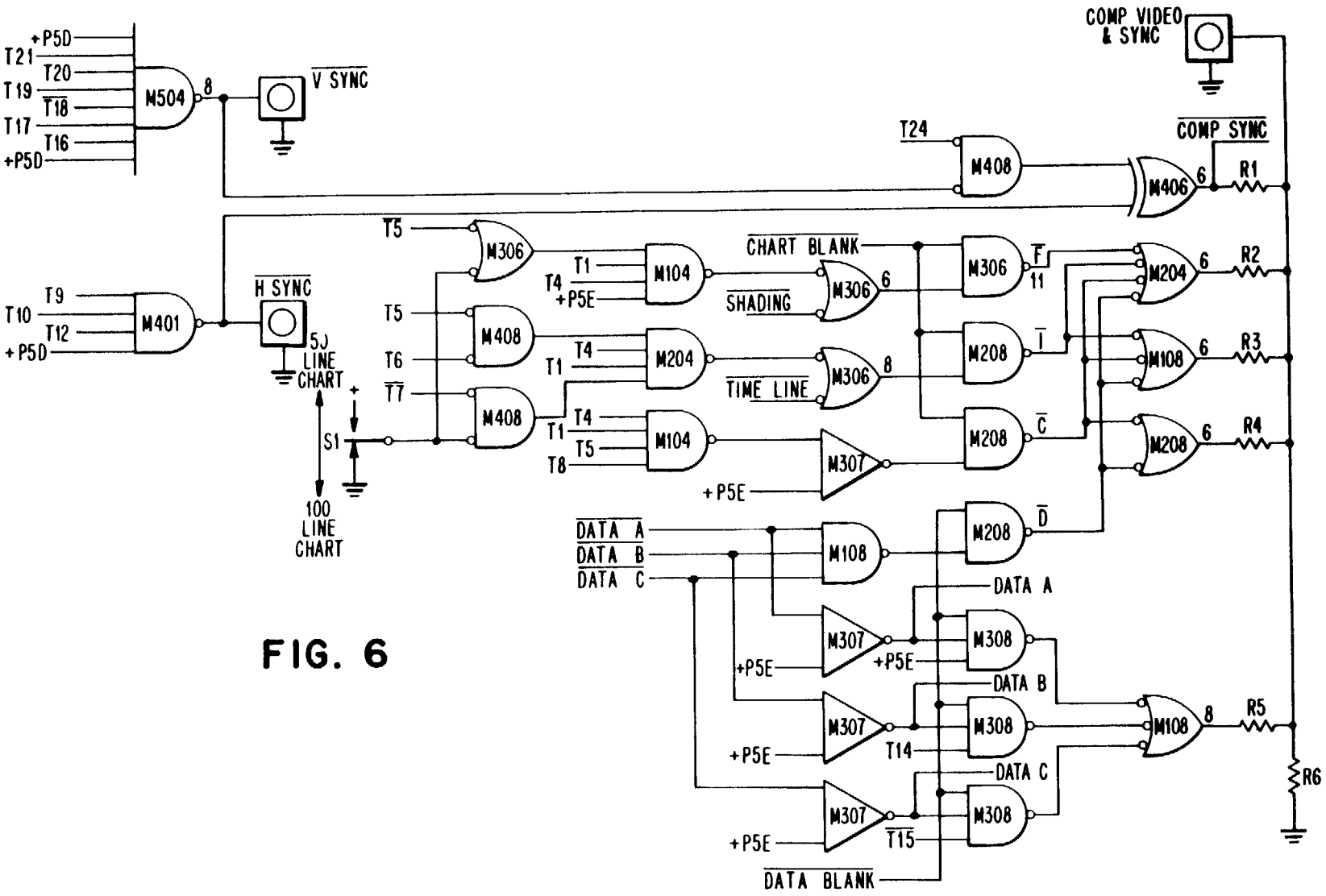
FIG. 6 shows logic circuitry for producing different levels of the brightness signal.

THE REPRESENTATION OF DATA MARKS AND CHART LINE MARKS AT DIFFERENT INTENSITIES, FIG. 6

The circuitry of FIG. 6 performs most of the functions indicated by the gating and decoding block 34 in FIG. 2 and it produces the composite video signal as indicated by the block 38.

In the following description the system will be described as producing a 100-line chart such as that of FIG. 4. The switch S1 can be moved to the upper position to produce a 50-line chart.

The composite video and synchronizing signal is developed across the resistor R6. It is produced by switching on or off the appropriate combination of gates M406-6, M204-6, M108-6, M208-6 and M108-8. This varies the current in resistor R6 and the voltage at the composite video and sync terminal.

A. Production of the Synchronizing Level.

The television monitor used in this implementation requires the synchronizing level to be the most negative excursion of the composite input signal. Synchonizing signals, derived by logical decoding of the states of counter outputs T9, T10, T11 by gate M401 for horizontal synchronization and of counter outputs T16, T17, T18, T19, T20 and T21 by gate M504 for vertical synchronization, cause gate output M406-6 to be low. Moreover, the $\overline{\text{CHART BLANK}}$ and $\overline{\text{DATA BLANK}}$ signals are always low during synchronizing causing gate outputs M204-6, M108-6, M208-6 and M108-8 to also be low. Thus the composite video signal is low, or effectively ground.

B. Production of the Black Level.

When no synchronizing signal is present, gate output M406-6 is high. If the monitor screen is not to be brightened, as determined by the absence of chart line, shading line, or data signals, or the absence of the appropriate inverted blanking signal, $\overline{\text{CHART BLANK}}$ or $\overline{\text{DATA BLANK}}$, gate outputs M204-6, M108-6, M208-6 and M108-8 are all low. The high state of gate output M406-6 causes a current flow in R6 sufficient to produce a voltage drop of about 0.3 volts.

C. Production of the Dimmest Visible Level.

At the time when the monitor screen is to be brightened to any level (in order to display the chart, the time line, the data mark or the "shading") gate M204-6 is made high in response to a low value of any of the signals $\overline{F}$, $\overline{I}$, $\overline{C}$ or $\overline{D}$. In particular, signal $\overline{F}$ is low whenever the decoding of counter outputs T1, T4 and T5 indicates that the dimmest fine chart lines are to be displayed. When 204-6 is made high a current flows in R6 sufficient to provide an additional voltage drop of about 0.15 volts. Since the synchronizing pulses are always absent at these times, the latter voltage drop is added to the former one of 0.3 volts, giving a drop in R6 of 0.45 volts when the screen is to be brightened to the lowest brightness level.

D. Production of Higher Intensity Levels.

Likewise, when the screen is to be brightened to emphasize each fifth or tenth line of the chart, or to cause a time line to be drawn across the display, or to produce a data mark, gate M108 output 6 is made high in response to the absence of any of signals $\overline{I}$, $\overline{C}$ or $\overline{D}$. In particular, signal $\overline{I}$ is low whenever the decoding of counter outputs T1, T4, T5 and T6 indicates that each fifth of the chart lines should be displayed, or whenever the signal $\overline{\text{TIME LINE}}$ is low, indicating that the data should be accompanied by a time line. When M108 output 6 is high an additional current flows in R6 to produce, when added to the other currents from M406 output 6 and M204 output 6, a drop of about 0.6 volts.

When the screen is to be brightened to emphasize each tenth chart line, decoding of counter outputs T1, T4, T5 and T8 causes input $\overline{C}$ of gate M208-6 to go low and thus the total voltage drop in R6 is brought to 0.75 volts.

Figure 8:
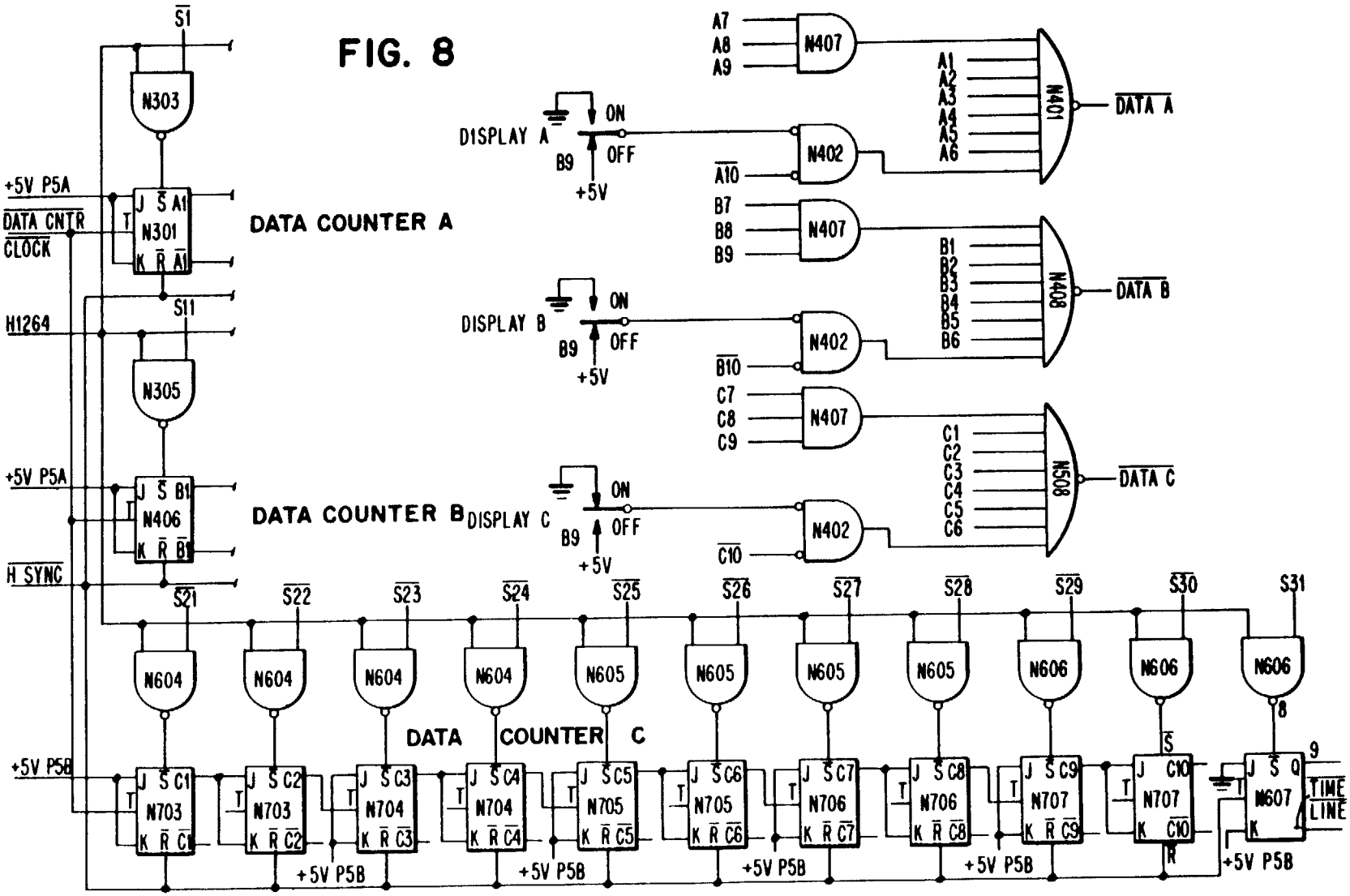
FIG. 8 shows the data counters.

The system is capable of displaying three separate data marks on each raster line. When one of these marks is to be displayed at the brightest level in the picture, signal $\overline{D}$ is low, making gate M208-6 high, and one of the inputs 9 of gate M108-8 is made low, making the output high and bringing the total voltage drop in R6 to about 0.9 volts. These actions result from the decoding of all the states of one of the data counters, such as C1, C2, C3, C4, C5, C6, C7, C8, C9 and C10 in FIG. 8, provided that the switch DISPLAY C is turned ON as shown. The ability to turn the individual data marks on or off by switches DISPLAY A, DISPLAY B and DISPLAY C aids the operator to identify and interpret the traces.

THE UPDATING CIRCUITRY, INCLUDING SYSTEM CONTROL 45, FIGS. 7-11

Figure 7:
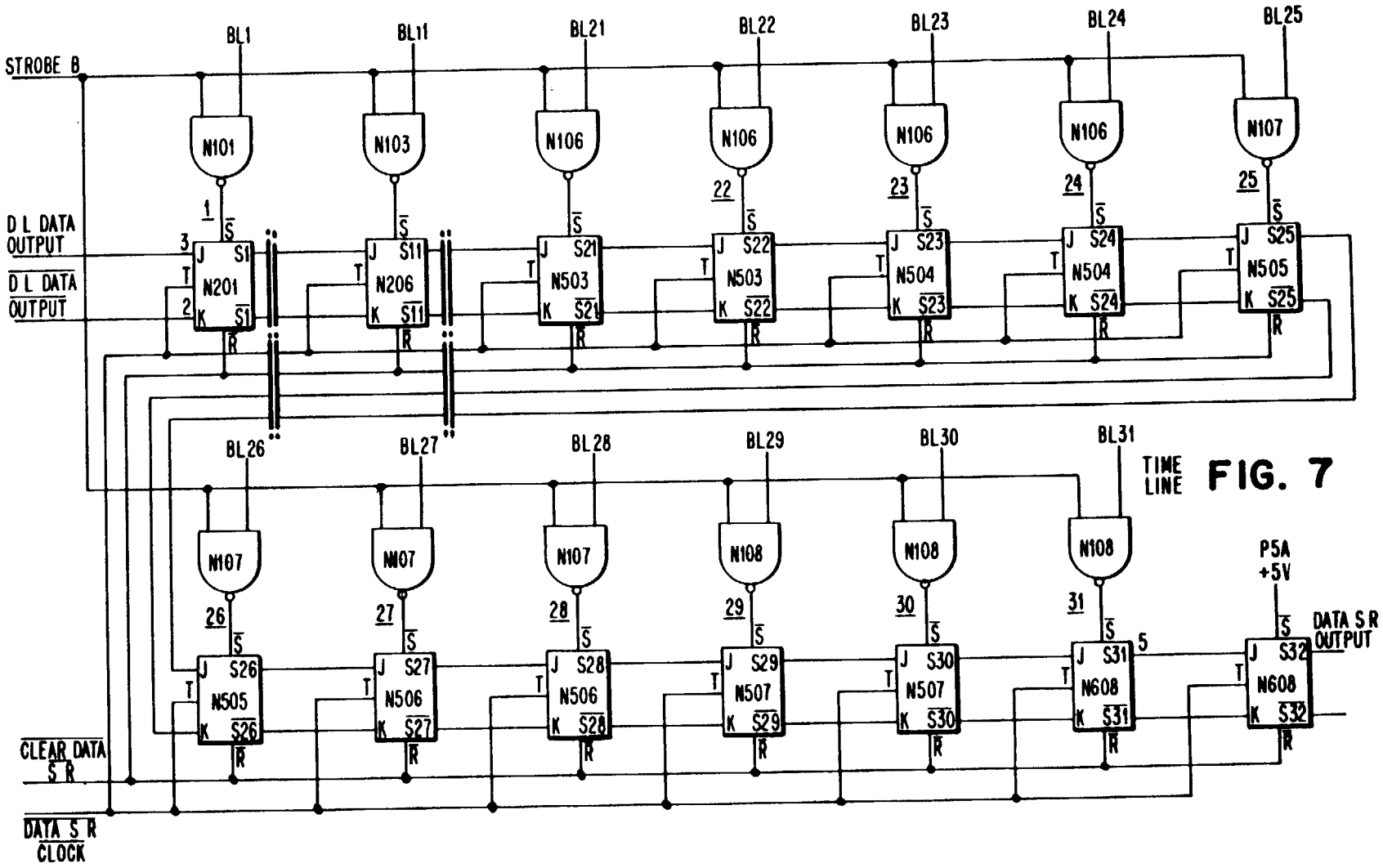
FIG. 7 shows the shift register.

FIG. 7 is a detail of the shift register 39 of FIG. 2. Stages 2-10 have been deleted and stages 12-20 have been deleted. The deleted stages are in all ways similar to stages 22-30 which have been shown.

FIG. 8 shows the gates, data counters and decoders 41 of FIG. 2. Three 10-stage data counters are provided, one for each of the measured variables to be displayed. Only the data counter including the stages N703-N707 has been entirely shown. These 10 stages make up data counter C. The J-K flip-flop stage M406 is the first stage of data counter B and the flip-flop N-301 is the first stage of data counter A.

FIG. 9A shows the update flip-flop made up of the logic unit M-706 and FIG. 9B shows the logic circuits M604 and 605 which control the delay line interlace. FIG. 10 shows the shift register control circuit.

FIG. 11 shows the delay line shift flip-flop.

The data record displayed consists of 513 35-bit binary words stored serially in the acoustic delay line serial memory 40 (FIG. 2). An alternative implementation of the system would use a set of long semiconductor shift registers connected serially to have a capacity of 465 or more 31-bit words, with appropriate conventional clock, shift control and refreshing circuits. A third implementation, to perform the same functions as the other two, would organize the shift registers into three parallel memory systems, each being a serial memory with a capacity of 465 or more words, two of the systems using 10-bit words and one using 11-bit words. Alternatively, a random access memory with a cyclic address system, or a magnetic drum or disc memory can be used.

For convenience and economy the delay line memory has a delay time of 8⅓ milliseconds, and is operated in the conventional interlaced mode so that each bit is circulated twice through the memory. Every alternate bit is decoded to be used for control purposes at the output. Recirculation to obtain proper interlace is controlled by gates M605-3, M605-6, M604-6 and M604-8, of FIG. 9B. For simplicity, the following description will treat the delay line and its input gating and control as if it had a delay time of 16⅔ milliseconds and no interlacing.

Only the 465 words which appear at the output of the delay line during the scanning of the 465 visible lines of the television monitor screen are used to control the display. Also, only 31 of the 35 bits in each word are used for control.

At all times during operation of the display the delay line data output is applied to inputs 2 and 3 of the 32-bit long shift register composed of J-K flip-flops N201 through N208 inclusive, N601, N502 through N507 inclusive, and N608 of FIG. 7. This shift register is also provided with 31 input gates connected to the wires marked BL1-B31 inclusive, through which parallel data are entered from the external data source, a computer or other digital device. The states of all stages of the register are available and used to access the data from the delay line for control of the monitor picture.

During normal operation of the display the delay line data output is also applied through gates M605-3, M605-6, M604-6, and M604-8 of FIG. 9B to the delay line data input for recirculation without modification. In this mode, as each word appears at the delay line data output, it is clocked into the shift register at the same time it is being fed to the delay line data input through the interlace gates of FIG. 9B. When the shift register is filled, toward the end of a monitor raster line sweep period, pulse H1264 is generated by the decoding of counter states T3, T5, T6, T7, T9, T11 and T12 in gates M205-6, M-304-6, M305-6 and M305-8 of FIG. 16 and is applied to gates N303, N305, N604, N605 and N606 of FIG. 8 to set the data counter stages (for example, N301, N406, N703-N707 and N607-9 of FIG. 4) to states complementary to those of the corresponding stages of the shift register.

When "update" is called for, data input line BL32 (FIG. 9A) is made high. Then through the action of gates M707-8, M707-11, and M706-8, FIG. 9, when STROBE A is generated by gate N704-6 (FIG. 17) during the raster line time just preceding the top displayed line of a monitor frame, the update flip-flop, M706-3 and M706-6, is set. Near the end of the 464th raster line of the next frame, gates M605-8 and M608-8 (FIG. 15) drop the CLEAR DATA $\bar{S}$./ signal briefly to ground about 140 nanoseconds after the H1264 pulse has caused transfer of data from the shift register to the data counters as described above. This resets all stages of the shift register to zero. Early in the sweeping of the 465th line of the frame, gate M606-8 (FIG. 15) generates pulse STROBE B to set the states of the first 31 shift register stages equal to the states of data input lines BL1-BL31 (which, of course, represent the new "updated" data). This occurs before any bit of the next data word appears at the D.L. data output. STROBE B also sets the D.L. shift flip-flop, M603-3 and M603-6. (FIG. 11) The resulting change of state of signals S and $\bar{S}$ changes the signal paths through gates M605-6, M604-6 and M604-8 (FIG. 9B) so that the DATA S.R. OUTPUT of the shift register is connected to the DELAY LINE DATA INPUT and the DELAY LINE DATA OUTPUT is correspondingly disconnected from DELAY LINE DATA INPUT. As a consequence, the new data word is shifted from the shift register into the delay line data input while the former first data word (to control the data formerly displayed on the top line of the monitor picture) is shifted from the delay line data output to the shift register during the scanning of the bottom displayed line of the monitor picture. Thereafter the data shift register clock pulses are interrupted by gate M408-3 and flip-flop M407-9 (FIG. 10) until the scanning of the top display line of the next monitor frame.

The foregoing is equivalent to throwing the switch 44 (FIG. 2) to the upper position. This inserts the word from the shift register into the delay line loop.

During scanning of the 465th line of the frame being discussed, gate M706-11 (FIG. 9A) acts to reset the update flip-flop. If another update is not required immediately, data input line BL32 will have been reset by the data source to ground level before the next STROBE A pulse time.

While the next frame is scanned, during each line scan time the data from the shift register output will be shifted into the delay line data input as data are accepted into the shift register input from the delay line data output, until, late in raster line 464, the delay line shift flip-flop M-603-3 and M603-6 (FIG. 11) is reset by gate M-603-8. This changes signals S and $\bar{S}$ to their normal states and the signal paths through gates M605-6, M604-6 and M604-8 (FIG. 9B) again connect the delay line data output directly to the delay line data input. The foregoing is equivalent to throwing the switch 44 (FIG. 2) back to the lower position while the old "465" word is still in the shift register. Therefore the old "465" word is deleted.

The result of this operation is that the new data word has been put in the data stream circulating in the delay line in place of the word which formerly controlled the data presentation for the top line of the display, the data word which controlled the top line has been put in place of that which controlled the second line, and every other word has been "shifted back" one line time except the last word, which has been eliminated from the circulating stream.

THE CIRCUITRY FOR APPLYING THE HORIZONTAL TIME LINES

If a time line is required to accompany the representation of a given set of data points, line BL31, FIG. 7, from the external data source is made high when the associated data word is entered by the updating process just described. At the time of updating, when signal STROBE B is high, this causes the shift register stage N608-5 (FIG. 7) to be set, and thus the 31st bit of the data word entered in the delay line to be a "one."

Whenever a data word has been completely shifted from the delay line data output into the shift register, shift register state N608-5 will be set if the 31st bit of the data word is a "one," indicating that a time line accompanies the data. Signal H1264 is briefly made high, opening gate N606-8 (FIG. 8) to set flip-flop N607-9, making signal $\overline{\text{TIME LINE}}$ low, to remain in this state until the next occurrence of $\overline{\text{HSYNCH}}$ towards the end of the next raster line. Signal $\overline{\text{TIME LINE}}$ is connected through gate M306-8, FIG. 6, to make $\overline{\text{I}}$ low, turning on gates M204-6 and M108-6 and producing a drop of at least 0.6 volt in R6 during the duration of the chart generation period, as defined by the presence of signal $\overline{\text{CHART BLANK}}$.

THE CIRCUITRY FOR OBTAINING SHADING

Shading, as implemented in the display system described here, extends from the left-hand chart line to the position of the data mark representing a selected one of the three displayed variables. The operator may turn on one of three switches to obtain shading of the variable he has chosen. The three switches are S5, S6 and S7 of FIG. 12. When one of these switches is turned ON, one of the three inputs of gate N805-12 is low, enabling gate N803-11 to pass pulse H1397, which is substantially coincident in time with the generation of the video signal to produce the left-hand chart line. Thus the flip-flop made up of gates N806-6 and N806-11 is set, making the $\overline{\text{SHADING}}$ signal low, and through gates M306-6 and M306-11 (FIG. 6) causing signal $\overline{\text{F}}$ to be low and gate output M204-6 to be high. This gives a voltage drop in R6 of 0.45 volts, causing the monitor screen to be brightened to the same level as is used to mark the fine chart lines.

The bits of the data word which designate the value of the variable selected by the switch will, prior to the occurrence of pulse H1397, have been used to set one of the three DATA COUNTERS of FIG. 8 to the ones complement of the data value. Beginning at the time the left-hand chart line signal is generated, the $\overline{\text{DATA CNTR CLOCK}}$ pulses increment each of the three ten-bit counters. When all the stages of a counter reach the "one" state, the corresponding signal, DATA A, DATA B, or DATA C (FIG. 6) goes high. This signal is passed by one of the gates N804-3, N804-6, or N804-8 (FIG. 12) to reset the flip-flop N806-6 and N806-11, causing the $\overline{\text{SHADING}}$ signal and signal $\overline{\text{F}}$ (FIG. 6) to go high, ending the shading.

OTHER CIRCUITS

Figures 12, 13:
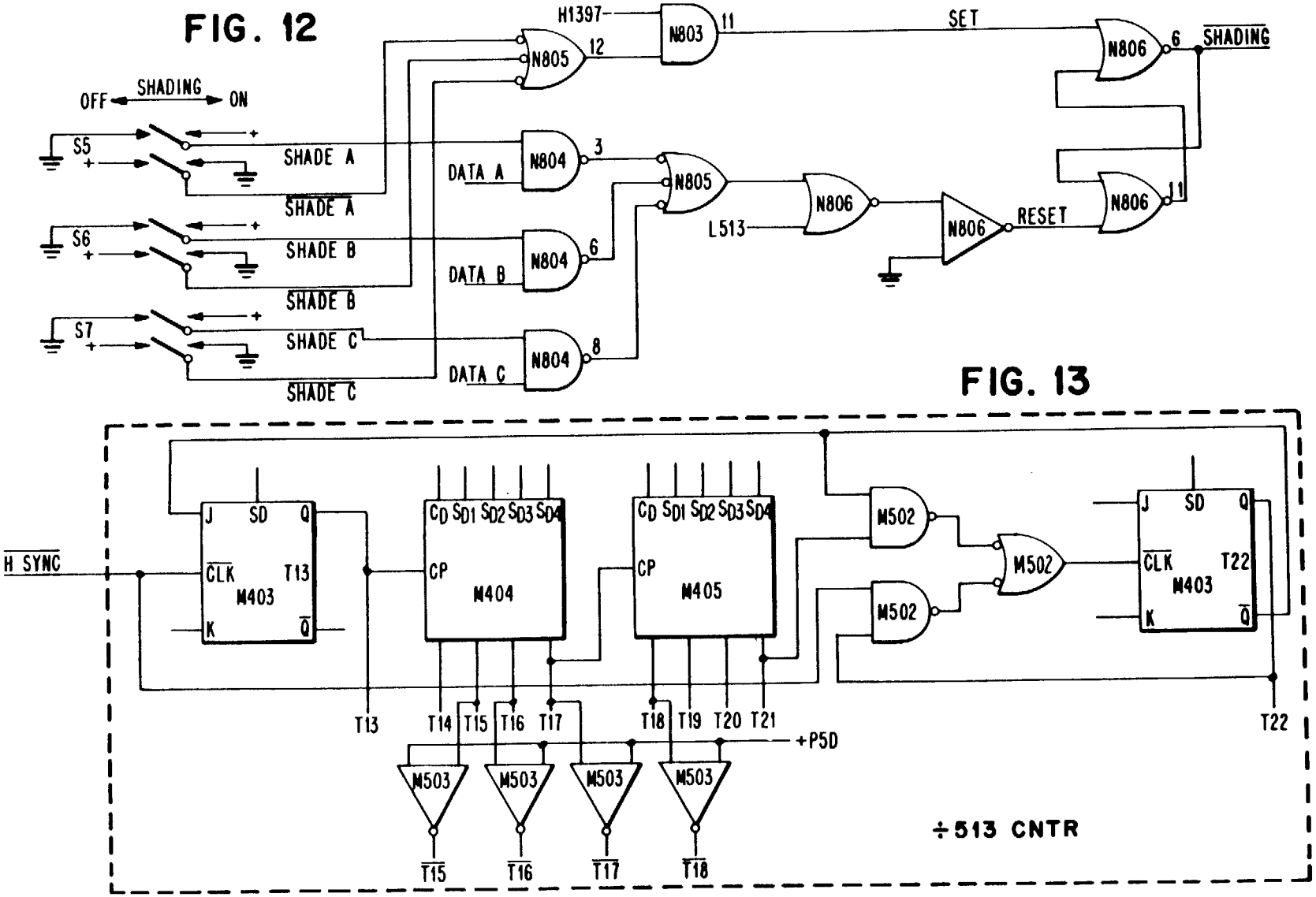
FIG. 12 shows the shading switches and the logic circuitry for obtaining the shading signal.
FIG. 13 shows the line counter.
Figure 14:
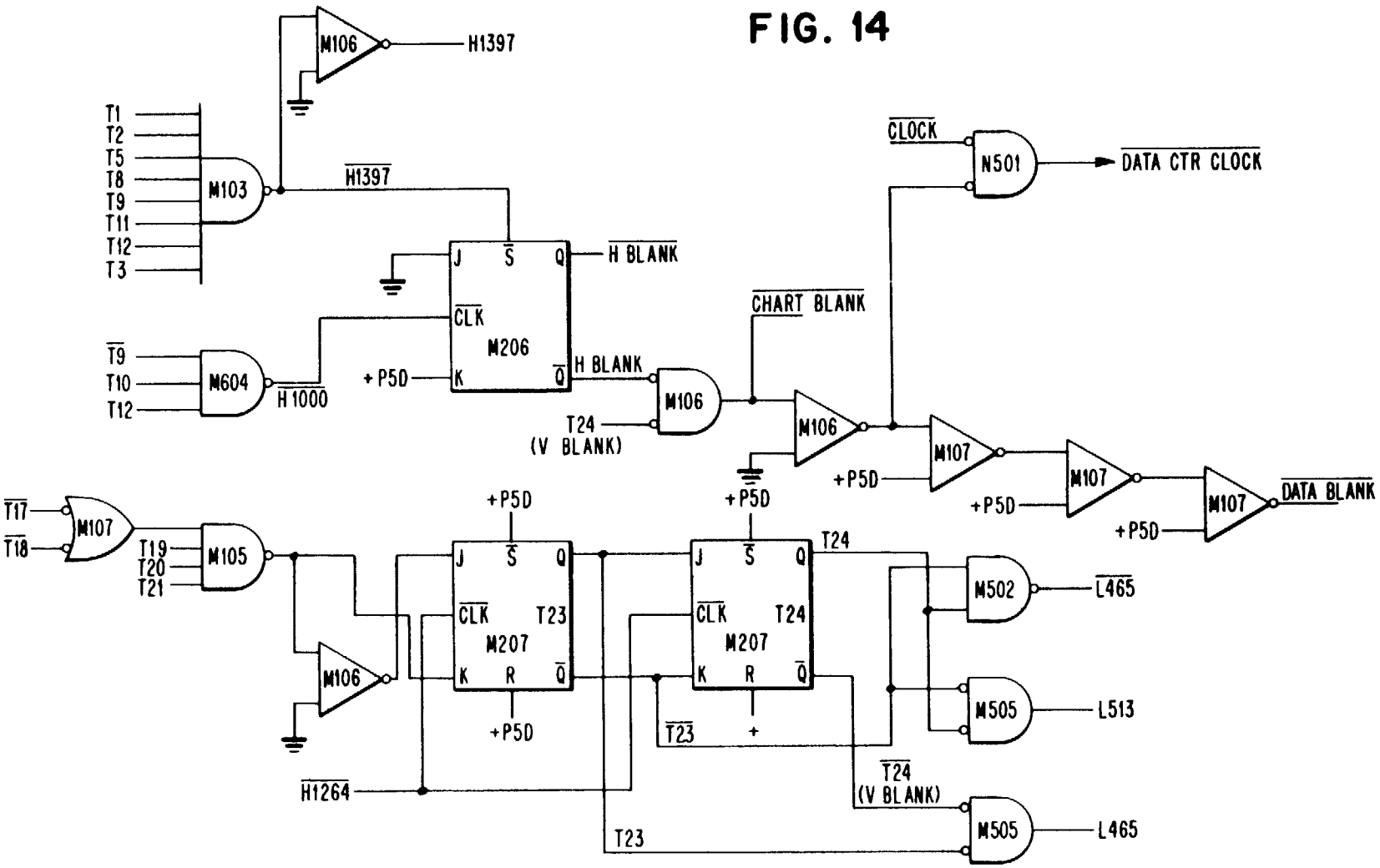
FIG. 14 shows logic for obtaining the blanking signal.

FIG. 13 shows the circuitry for producing the vertical flyback. Horizontal sync pulses are counted in a divide-by-513 counter made up of the modules M403, M404 and M405. After counting 513 $\overline{\text{H SYNC}}$ pulses the outputs $\overline{\text{T15}}$, $\overline{\text{T16}}$, $\overline{\text{T17}}$, $\overline{\text{T18}}$ are applied to the gate N504-8, FIG. 6, to produce the vertical sync signal. FIG. 14 shows the logic circuitry for producing the horizontal and vertical blanking pulses and other necessary signals, including pulses at lines 465 and 513.

Figure 18:
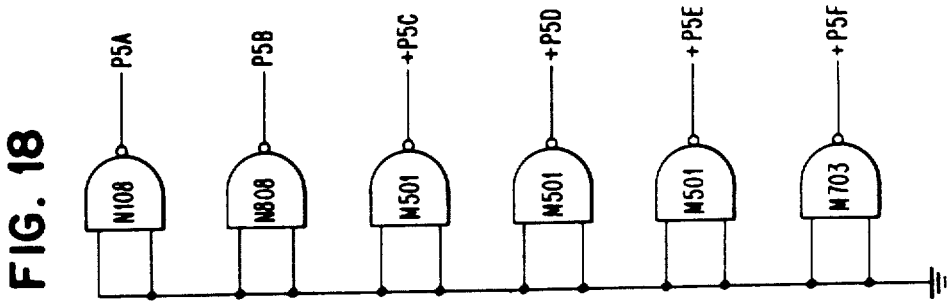
FIG. 18 shows inverting gates for producing logical ones.
Figure 17:
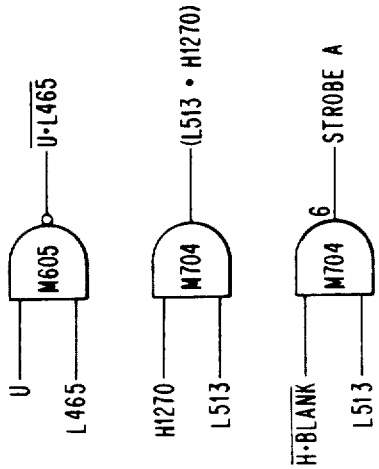
FIG. 17 shows gates for producing timing and strobe pulses.
Figure 16:
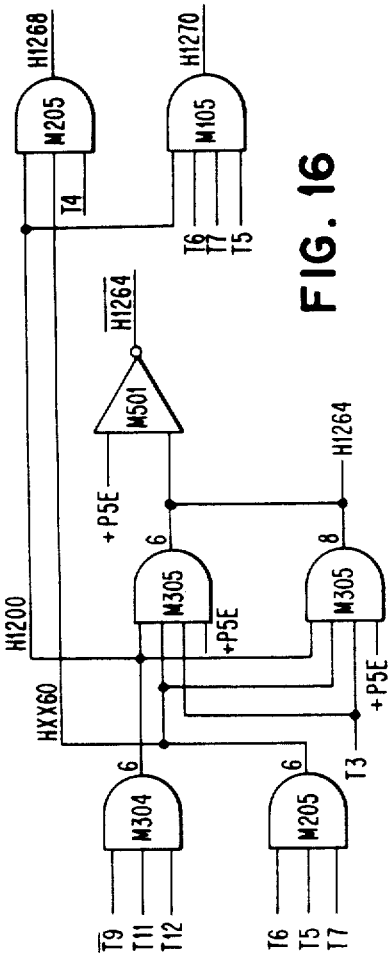
FIG. 16 shows the circuitry for producing scan line timing pulses.
Figure 15:
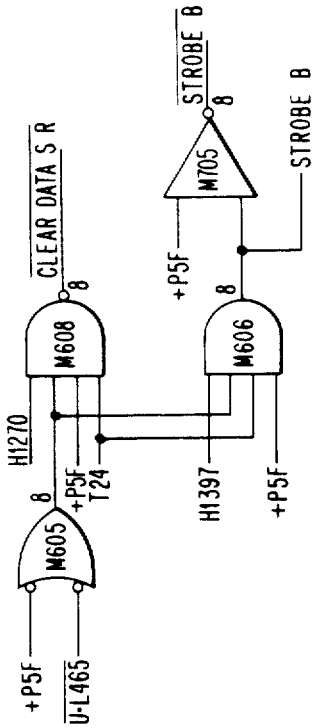
FIG. 15 shows logic circuitry for producing signals, clearing the shift register and transfer of data into the shift register.

FIG. 15 shows the logic circuitry for producing the $\overline{\text{CLEAR DATA SHIFT REGISTER}}$ and the $\overline{\text{STROBE B}}$ pulses. FIG. 16 shows the logic circuitry for producing pulses H1264, H1268 and H1270 which occur during each scan line at counts of 1264, 1268 and 1270 respectively. FIG. 17 shows the logic for producing pulse signals $\overline{\text{U}}\cdot\overline{\text{L465}}$, (L513·H1270) and STROBE A. FIG. 18 shows gates connected to supply logical one states as required in the system.

The following list of typical circuit elements is exemplary and is not to be considered limiting of the invention. In the following tabulation, the designations M101, N102, etc., are the same as those used in FIGS. 5–18 and also show the locations which these modules occupy in the actual execution of the invention.

| | |
|---|---|
| M101 | Motorola MC3062 Dual J-K flip-flop |
| M102 | Motorola MC3002 Quad 2-input NOR gate |
| M103 | Motorola MC3015 8-input NAND gate |
| M104 | Motorola MC3010 Dual 4-input NAND gate |
| M105 | Motorola MC3026 Expandable Dual 2-wide 2-input AND-OR-INVERT gate |
| M106 | Motorola MC3002 Quad 2-input NOR gate |
| M107 | Motorola MC3000 Quad 2-input NAND gate |
| M108 | Motorola MC3005 Triple 3-input NAND gate |
| M201 | Motorola MC3061 Dual J-K flip-flop |
| M202 | Motorola MC3062 Dual J-K flip-flop |
| M203 | Motorola MC3061 Dual J-K flip-flop |
| M204 | Motorola MC3010 Dual 4-input NAND gate |
| M205 | Motorola MC3006 Triple 3-input AND gate |
| M206 | Motorola MC3062 Dual J-K flip-flop |
| M207 | Motorola MC3061 Dual J-K flip-flop |
| M208 | Motorola MC3000 Quad 2-input NAND gate |
| M301 | Motorola MC3020 Expandable Dual 2-wide 2-input AND-OR-INVERT gate |
| M302 | Motorola MC3061 Dual J-K flip-flop |
| M303 | Motorola MC3061 Dual J-K flip-flop |
| M304 | Motorola MC3006 Triple 3-input AND gate |
| M305 | Motorola MC3026 Dual 4-input AND power gate |
| M306 | Motorola MC3000 Quad 2-input NAND gate |
| M307 | Motorola MC3000 Quad 2-input NAND gate |
| M308 | Motorola MC3005 Triple 3-input NAND gate |
| M401 | Motorola MC3025 Dual 4-input NAND power gate |
| M403 | Motorola MC953 Dual J-K flip-flop |
| M404 | Motorola MC839 Divide by 16 counter |
| M405 | Motorola MC839 Divide by 16 counter |
| M406 | Texas Instruments SN-7486 Quad 2-input exclusive-OR gate |
| M407 | Motorola MC3062 AND input JJ-KK flip-flop |
| M408 | Motorola MC3002 Quad 2-input NOR gate |
| M501 | Motorola MC3000 Quad 2-input NAND gate |
| M502 | Motorola MC3000 Quad 2-input NAND gate |
| M503 | Motorola MC3000 Quad 2-input NAND gate |
| M504 | Motorola MC3015 8-input NAND gate |
| M505 | Motorola MC3002 Quad 2-input NOR gate |

-continued

| | |
|---|---|
| M508 | Motorola MC3025 Dual 4-input NAND power gate |
| M603 | Motorola MC3000 Quad 2-input NAND gate |
| M604 | Motorola MC3005 Triple 3-input NAND gate |
| M605 | Motorola MC3000 Quad 2-input NAND gate |
| M606 | Motorola MC3026 Dual 4-input AND power gate |
| M608 | Motorola MC3025 Dual 4-input NAND power gate |
| M703 | Motorola MC3002 Quad 2-input NAND gate |
| M704 | Motorola MC3001 |
| M705 | Motorola MC3000 Quad 2-input NAND gate |
| M706 | Motorola MC3000 Quad 2-input NAND gate |
| M707 | Motorola MC3000 Quad 2-input NAND gate |
| M708 | Motorola MC3000 Quad 2-input NAND gate |
| N101 | Motorola MC3000 Quad 2-input NAND gate |
| N103 | Motorola MC3000 Quad 2-input NAND gate |
| N106 | Motorola MC3000 Quad 2-input NAND gate |
| N107 | Motorola MC3000 Quad 2-input NAND gate |
| N108 | Motorola MC3000 Quad 2-input NAND gate |
| N201 | Motorola MC3061 Dual J-K flip-flop |
| N206 | Motorola MC3061 Dual J-K flip-flop |
| N301 | Motorola MC3061 Dual J-K flip-flop |
| N303 | Motorola MC3000 Quad 2-input NAND gate |
| N305 | Motorola MC3000 Quad 2-input NAND gate |
| N401 | Motorola MC3015 8-input NAND gate |
| N402 | Motorola MC3002 Quad 2-input NOR gate |
| N406 | Motorola MC3061 Dual J-K flip-flop |
| N407 | Motorola MC3006 Triple 3-input AND gate |
| N408 | Motorola MC3015 8-input NAND gate |
| N501 | Motorola MC3002 Quad 2-input NOR gate |
| N503 | Motorola MC3061 Dual J-K flip-flop |
| N504 | Motorola MC3061 Dual J-K flip-flop |
| N505 | Motorola MC3061 Dual J-K flip-flop |
| N506 | Motorola MC3061 Dual J-K flip-flop |
| N507 | Motorola MC3061 Dual J-K flip-flop |
| N508 | Motorola MC3015 8-input NAND gate |
| N601 | Motorola MC3061 Dual J-K flip-flop |
| N602 | Motorola MC3061 Dual J-K flip-flop |
| N603 | Motorola MC3000 Quad 2-input NAND gate |
| N604 | Motorola MC3000 Quad 2-input NAND gate |
| N605 | Motorola MC3000 Quad 2-input NAND gate |
| N606 | Motorola MC3000 Quad 2-input NAND gate |
| N607 | Motorola MC3062 AND input JJ-KK flip-flop |
| N608 | Motorola MC3061 Dual J-K flip-flop |
| N702 | Motorola MC3061 Dual J-K flip-flop |
| N703 | Motorola MC3061 Dual J-K flip-flop |
| N704 | Motorola MC3061 Dual J-K flip-flop |
| N705 | Motorola MC3061 Dual J-K flip-flop |
| N706 | Motorola MC3061 Dual J-K flip-flop |
| N707 | Motorola MC3061 Dual J-K flip-flop |
| N803 | Motorola MC3001 |
| N804 | Motorola MC3000 Quad 2-input NAND gate |
| N805 | Motorola MC3005 Triple 3-input NAND gate |
| N806 | Motorola MC3002 Quad 2-input NOR gate |
| N808 | Motorola MC3000 Quad 2-input NAND gate |

MODIFICATIONS OF THE INVENTION

As previously mentioned, the digital data storage device including the shift register and recirculating delay line may be replaced by a random access memory. Such a memory together with an address counter does not require the recirculation and shifting of data. Rather, by periodically updating the address counter, the relationship between the counter address and the scan lines is merely shifted. While the invention has been described as representing data values at uniform increments of time, it will be understood that the time increments need not be uniform.

The system actually described includes a chart line, synchronizing and control counter 33 and data counters 41 (FIG. 2). All counters respond to the same clock pulses from the crystal clock 32. Though the two counters may be preferred, a single counter may be so controlled as to perform the same functions as the two counters.

In the system described, changes in intensity are effected by changes in the brightness on the display. Another way to effect changes in intensity is by activating different color phosphors on a color TV monitor. The use of such a color TV monitor is within the scope of this invention.

Figure 19:
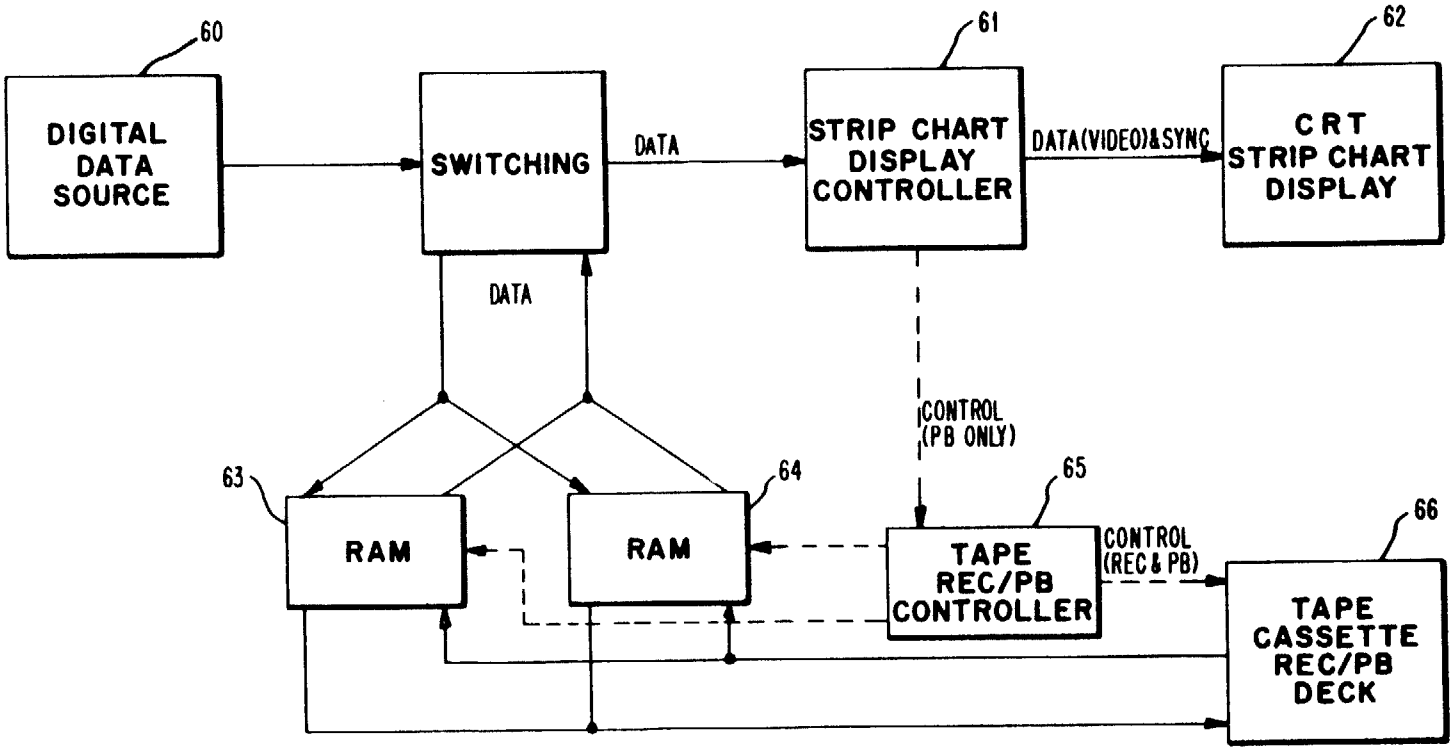
FIG. 19 shows a tape recording system which may be used with the invention.

It will be appreciated that the input data words representing the measured variable can be obtained from a number of sources. It has been common to convert measured variables to digital words and to record them on magnetic tape or a magnetic drum for later replay, and if desired, for real time display of the measured variable. A particularly suitable system for recording and playing back the measured variables is shown in FIG. 19. This system accepts new data values when available from external digital data source 60. The strip chart display controller 61 and the CRT strip chart display 62 of this invention are not essential to the record mode of operation but may be used, if desired, for real time monitoring of the data being recorded.

In the record mode, consecutive data words are received and stored in one of the two buffer memories 63 and 64. When a buffer is filled the controller 65 starts the tape deck 66. When the tape is up to speed, the buffer contents are encoded serially-by-bit in a bi-phase code which is self-clocking as required for a single-track digital recording, until the buffer contents are completely recorded, when the tape drive is turned off. The codes are thus written on the cassette tape. The bi-phase code recording is also known as the frequency doubling method.

During writing or recording, further incoming data words are stored in the other buffer. The words in the other buffer are then encoded and written on the tape when this other buffer is filled. Operation is asynchronous, the rate of the data source 60 being limited only by the requirement that filling of one of the buffers 63 or 64 should not be completed before the content of the previously filled buffer has been written on the tape.

The recording consists of data blocks or "records" spaced to permit stopping and starting of the tape between consecutive records in playback. In one implementation, each record comprises thirty-two 32-bit data words. Short (i.e., two-bit long) gaps are provided between adjacent data words and are used in playback to minimize propagation of errors through the data records.

In a modification of the recording method just described, the buffer memory 63 or 64 may be loaded with the data word deleted from the display (referred to above in the section titled "The Updating Circuitry" etc., page 18). In this case the tape recording function may be placed under automatic or manual control, so that the record to be produced may be "edited" by reference to the data already displayed.

In the playback mode, the tape controller receives a once-per-frame signal (e.g., the $\overline{\text{VSYNCH}}$ pulse in FIG. 6) from the display controller 61. This signal is used, either directly or counted-down, as a display update request. In response to each request, the tape controller 65 reads a data word out of one of its internal buffers and sets an update bit which causes the display controller to update the display in the following frame time. When reading of all words in the buffer has been completed, the tape controller 65 starts the tape deck, reads and decodes a data record from the tape, writes this data, serially-by-bit, in the buffer, and then stops the deck. Meanwhile, further update requests are being met by reading data words from the second buffer which will in turn be written with new data from the tape when reading is completed.

As each bit is read from buffers 63 or 64 in the playback, a logical zero is written in its place. This "destructive read" causes the data trace on the strip chart 62 to fall to zero when no new data is available to meet update requests (e.g., when the end of a recording is reached). Alternatively, a logical one may be written in place of each bit. Then the data trace would go offscale to the right and would not be displayed when no new data is available.

As in the record mode, operation in the playback mode is asynchronous. The chart advance (i.e., updating) can be stopped at any time by means of a switch which blocks update requests from the display controller.

The system in FIG. 19 is particularly advantageous because it provides digital recording of data on a compact and erasable medium and display of the recorded data in analog strip chart form.

The bi-phase code used in recording on tape permits the data to be read backwards without confusion. An alternative implementation of the system of FIG. 19 could permit the tape to be run backward during replay. The buffers could be loaded as described above, but each word could be inverted as it is read from the buffer. The display controller would also be modified so that the new data point can be displayed on the lowest visible raster line, and each old data point be shifted one line up in the display. The data point which formerly appeared on the top visible raster line would disappear from the strip chart format. In this case, the strip chart format will move upward on the display as the tape is read backward, or downward as the tape is read forward.

A particular advantage of this recording and display system is that the digital magnetic records are readable automatically, so that the recorded data can be economically and conveniently transferred to a digital computer for analysis, computation, modification, or the like, and the results can if desired be displayed in the familiar strip chart format.

While particular embodiments have been shown and described, it will be appreciated that other modifications are within the scope of this invention.

What is claimed is:

1. The method of graphically displaying a time variant, digitally sampled, measured variable in moving strip chart format on a cathode ray tube system having an intensity modulated electron beam which traverses the face of the tube along successive scan lines in a raster frame comprising:

a. modulating the intensity of said electron beam at a position in a first scan line of a first raster frame, said position representing the magnitude of said measured variable at a first time, b. modulating the intensity of said electron beam at positions in successive scan lines of said first raster frame, said positions representing the magnitudes of said measured variable sequentially at times one preceding another, to produce a trend line along said strip chart format representing said measured variable, c. modulating the intensity of said electron beam at a position in said first scan line of a later raster frame, said position representing the magnitude of said measured variable at a second time, d. modulating the intensity of said electron beam at positions in successive scan lines of said later raster frame, said positions representing the magnitude of said measured variable at times prior to said later time, [and]

e. repeating the foregoing modulating steps for some subsequent raster frames to produce said moving strip chart format [.], *and*

*f. modulating the intensity of said electron beam in each scan line between a reference position and the position representing the magnitude of said measured variable to produce a display which is brightened between a reference line and said trend line to a lower level of brightness than said trend line.*

2. The method recited in claim 1 wherein a plurality of measured variables are displayed in moving strip chart format on said cathode ray tube system by modulating the intensity of said electron beam in each scan line at a plurality of positions each representing the magnitude of one of said measured variables at a given time.

3. The method recited in claim 1 further comprising: modulating the intensity of said electron beam at the same scale line positions on each scan line to produce scale lines along said strip chart format, said electron beam being modulated at said scale line positions to a different intensity than the modulation at positions representing said measured variable so that the scale lines are readily distinguishable from said trend line.

4. The method recited in claim 1 further comprising: modulating the intensity of said electron beam in scan lines associated with particular samples to produce time lines across said strip chart format, said time lines being distinguished from said trend line by a different intensity of modulation of said electron beam.

[5. The method recited in claim 1 further comprising the intensity of said electron beam in each scan line between a reference position and the position representing the magnitude of said measured variable to produce a display which is brightened between a reference line and said trend line.]

6. The method of graphically displaying a moving strip chart format on a cathode ray tube system having an electron beam which traverses the face of the tube along successive scan lines, said strip chart format representing successive values of an independent variable, and a plurality of stored, digitally encoded data signals representing measurements of a dependent variable, comprising:

a first step of receiving data signals corresponding to the independent variable, a second step of storing said data signals, a third step of counting clock pulses beginning at the time when the electron beam is at a reference position, a fourth step of producing for each scan line a first output signal when said clock pulse count corresponds to said data signal for that scan line, a fifth step of modulating said electron beam to a first intensity as the electron beam is scanned from said reference position to a position corresponding to said output signal, a sixth step of modulating said electron beam to a second intensity at the occurrence of each of said first output signals, repeating the foregoing steps for the remaining raster scan lines, and repeating said third through sixth steps for a later raster frame, the intensity of said electron beam being modulated in the scan lines of said later raster frame at positions corresponding to the output signal at times later than the times of the output signal for the preceding raster frame, the occurrence times of said output signal being displaced with respect to the scan line on which it is displayed on said later raster frame, one extreme value of said output signal being deleted and one value being added at the other extreme.

7. The method recited in claim 6 wherein said system includes a color reproducing cathode ray tube and wherein each of said different intensities is represented by a different color on the face of said cathode ray tube.

8. The method recited in claim 6 further comprising:

a seventh step of producing a plurality of second output signals at predetermined clock count intervals, and an eighth step of modulating the electron beam to a preselected intensity at the occurrence of each of said second output signals to produce vertical scale lines along said strip chart format.

9. The method recited in claim 8 further comprising:

a ninth step of producing a third output signal at preselected intervals of said independent variable, a tenth step of storing said signal produced in the ninth step in proper sequence with said data for said dependent variable, and an eleventh step of modulating the electron beam to another preselected intensity to produce horizontal time lines on said strip chart format.

10. A graphic cathode ray tube display system for displaying stored digital data of a plurality of measured variables, said system having a raster scan line type electron beam positioning circuit and intensity modulating control circuit comprising:

a source of clock pulses dividing said scan line into equal time increments, counter means for receiving said clock pulses including means for resetting said counter once during each scan line, a digital data storage device for storing data for each of said measured variables, the number of data for each variable corresponding to the number of displayed scan lines of said cathode ray tube display, means for selecting from storage a particular digital data prior to the beginning of each scan line, means for producing from said counter a first output when said counter reaches a count corresponding to said particular digital data, means responsive to said first output to modulate the intensity of the electron beam during each scan line thereby producing a trend line representing said measured variable, [and]

means for updating said data storage device after the scanning of all of said scan lines, said data being displaced with respect to the scan line on which it is displayed on a subsequent scanning of said scan lines, one extreme data value being deleted and one data value being added at the other extreme[.], *means for producing from said counter a second output at the occurrence of a preselected reference count,*

*a bistable device being set to one of its states upon the earlier occurrence of said first or second outputs and reset to the other of its states upon the later occurrence of said first or second outputs respectively, and*

*means responsive to the output of said bistable device to modulate said beam with a different intensity corresponding to said reference digital data.*

11. The system recited in claim 10 further comprising:

means for producing from said counter a [second] *third* output at predetermined count intervals for scaling each scan line, and means responsive to said [second] *third* output for modulating the intensity of said electron beam at a different intensity level to produce scale lines readily distinguishable from said trend line.

12. The system recited in claim 10 further comprising:

means for producing a [third] *fourth* output during scanning of scan lines corresponding to particular data, and means responsive to said [third] *fourth* output for modulating the intensity of said electron beam at a different intensity level to produce time lines readily distinguishable from said trend lines.

[13. The system recited in claim 10 further comprising:

means for producing from said counter a fourth output at the occurrence of a preselected reference count, a bistable device being set to one of its states upon the earlier occurrence of said first or fourth outputs and reset to the other of its states upon the later occurrence of said first or fourth outputs respectively, and means responsive to the output of said bistable device to modulate said electron beam with a different intensity between said reference count and said count corresponding to said particular digital data.]

14. A graphic cathode ray tube display system for displaying stored digital data of a plurality of measured variables, said system having a raster scan line type electron beam positioning circuit and intensity modulating control circuit comprising:

a source of clock pulses dividing said scan line into equal time increments, a first counter for receiving said clock pulses including means for resetting said counter once during each scan line, a digital data storage device for storing data for each of said measured variables, the number of data for each variable corresponding to the number of displayed scan lines of said cathode ray tube display, means for selecting from storage a particular digital data prior to the beginning of each scan line, a second counter for producing a first output when said second counter reaches a count corresponding to said particular digital data, means responsive to said first output to modulate the intensity of the electron beam during each scan line thereby producing a trend line representing said measured variable, [and]

means for updating said data storage device after the scanning of all of said scan lines, said data being displaced with respect to the scan line on which it is displayed on a subsequent scanning of said scan lines, one extreme data value being deleted and one data value being added at the other extreme[.],

*means for producing from said first counter a second output at the occurrence of a preselected reference count,*

*a bistable device being set to one of its states upon the earlier occurrence of said first or second outputs and reset to the other of its states upon the latter occurrence of said first or second outputs respectively, and*

*means responsive to the output of said bistable device to modulate said electron beam with a different intensity between said reference count and said count corresponding to said particular digital data.*

15. The system recited in claim 14 further comprising:

means for producing from said first counter a [second] *third* output at predetermined count intervals for scaling each scan line, and means responsive to [second] *third* output for modulating the intensity of said electron beam at a different intensity level to produce scale lines readily distinguishable from said trend line.

16. The system recited in claim 14 further comprising:

means for producing a [third] *fourth* output during scanning of scan lines corresponding to particular data, and means responsive to said [third] *fourth* output for modulating the intensity of said electron beam at a different intensity level to produce time lines readily distinguishable from said trend lines.

[17. The system recited in claim 14 further comprising:

means for producing from said counter a fourth output at the occurrence of a preselected reference count, a bistable device being set to one of its states upon the earlier occurrence of said first or fourth outputs and reset to the other of its states upon the later occurrence of said first or fourth outputs, respectively, and means responsive to the output of said bistable device to modulate said electron beam with a different intensity between reference count and said count corresponding to said particular digital data.]

* * * * *